Patented June 24, 1930

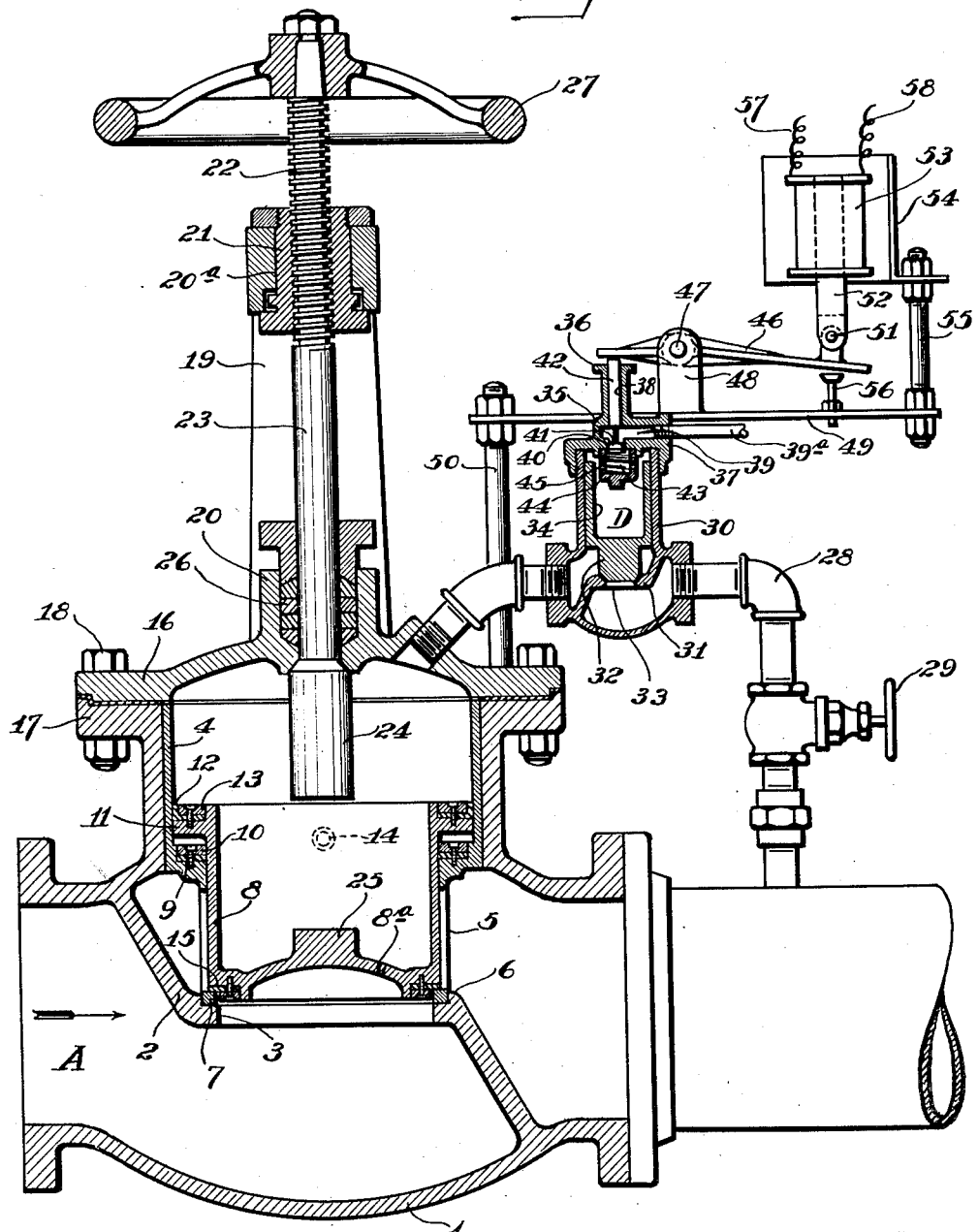

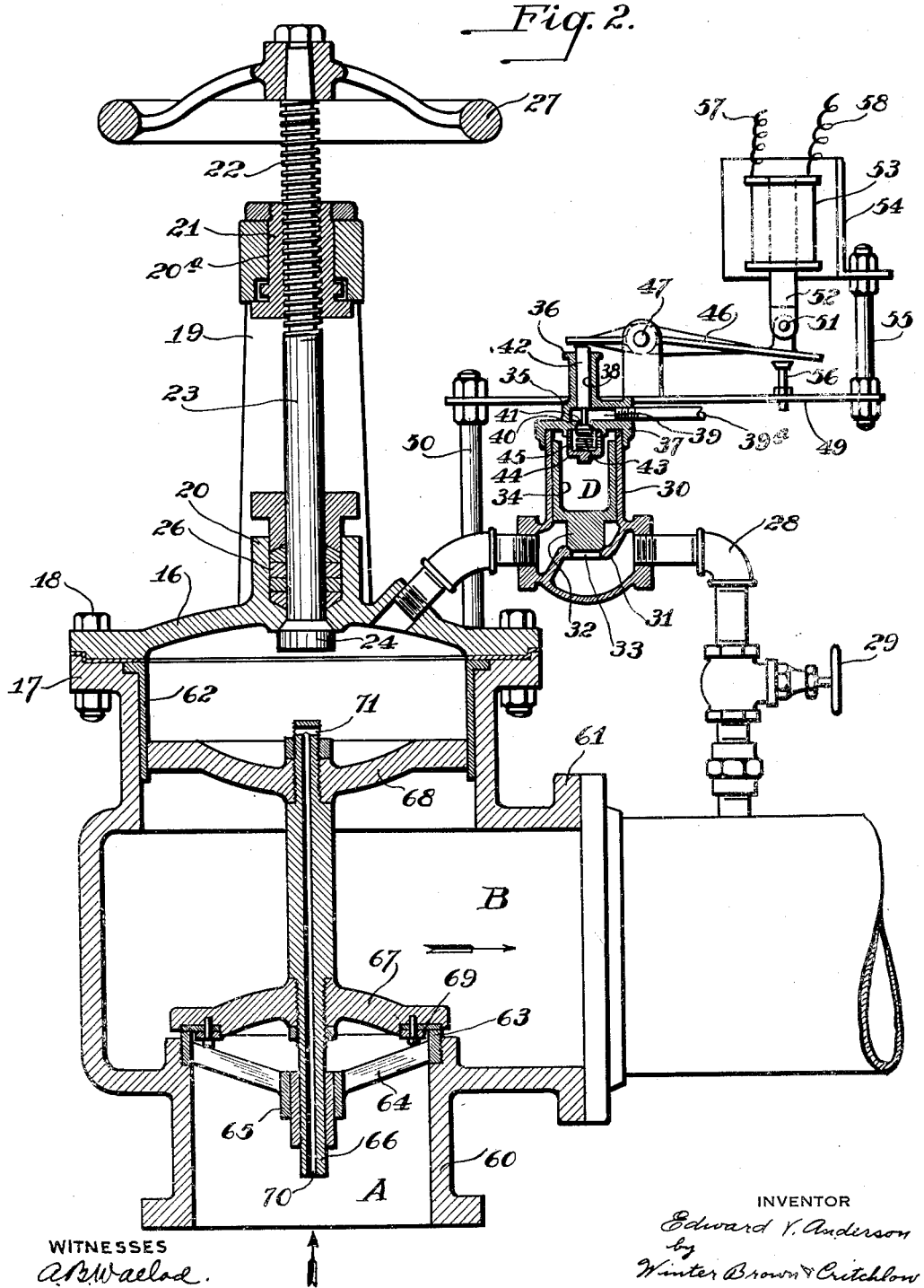

1,767,037

UNITED STATES PATENT OFFICE

EDWARD V. ANDERSON, OF BELLE VERNON, PENNSYLVANIA, ASSIGNOR OF ONE-HALF TO CHARLES E. GOLDEN, OF CRAFTON, PENNSYLVANIA

CUSHIONED COKE-QUENCHING VALVE

Application filed January 3, 1927. Serial No. 158,494.

This invention relates to valve mechanism, more particularly to the mechanism for controlling the opening and closing of hydraulic valves.

In water supply or distribution systems the valve mechanism is generally designed to permit the passage controlling valve to be normally opened by the pressure on the inlet side of the valve. In this type of valve the valve mechanism usually embodies a pilot valve and pressure responsive device which function to close the valve upon certain conditions of pressure or water level existing on the delivery side of the valve.

In accordance with the present invention the valve mechanism is designed to normally hold the passage controlling valve in its closed position and to provide for the opening of the valve when it is desired to establish a flow therethrough. The valve mechanism in accordance with the present invention is similar to the first mentioned type in that the opening and closing of the valve are effected by the fluid pressure in the system in which it is connected, this opening and closing being effected by manipulation of a pilot valve.

It is among the objects of this invention to provide a valve mechanism in which the valve will be opened and closed by control of the pressure inherent in the system and which is designed to normally hold the valve in its closed position.

Another object of this invention is to provide a valve mechanism for opening the passage closing valve which shall be adapted for remote control.

Another object of the invention is to provide a valve which shall be automatically cushioned in its opening and closing operations and which shall comprise a simple, durable, mechanical structure embodying a minimum number of parts.

Another object of this invention is to provide a valve mechanism of the above designated character which shall be adapted to be locked in its closed position.

In the accompanying drawings constituting a part hereof and in which like reference characters designate like parts, Fig. 1 is a vertical sectional view partially in elevation of a valve mechanism embodying the principles of this invention; and Fig. 2 is a similar view of a valve mechanism illustrating a modified form of piston valve but which otherwise functions in the manner of the valve illustrated in Fig. 1.

Referring to Fig. 1 of the drawings the structure therein illustrated comprises a valve casing 1 provided with a rigid diaphragm 2 having an opening 3 therein which constitutes a passage from the inlet side A to the outlet side B of the valve. The upper portion of the valve casing is of cylindrical shape and formed concentric with the port or opening 3 in the diaphragm 2.

A double-diameter cylinder member 4 has a constricted portion 5 disposed within the cylindrical portion of the valve casing and is adapted to seat in a counter-bore 6 formed in the diaphragm concentric with the opening 3. The lower portion of the cylinder 5 is provided with a radial flange 7 which constitutes the seat for main valve 8. A small port 8ª is provided through valve 8 for the purposes below described.

The lower portion of the cylinder 4 is provided with a liner 9 that is secured in place by a follower 10 as shown, and the upper portion of the valve 8 is provided with a radial flange 11 upon which is mounted a cup liner 12, secured thereto by a follower 13. The liners 9 and 12 seal off the chamber between the shoulder of the cylinder and the flange of the valve, constituting an air chamber to cushion the valve in its closing operation. An air vent 14 is provided in the valve casing to permit restricted escape of air, thereby producing the cushioning dash-pot effect. The lower face of the valve 8 is provided with a liner 15 on which the valve seats when closed.

A cover member 16 is secured to the flange 17 of the valve casing by a plurality of bolts 18. The upper portion of the cover 16 is provided with an integral yoke 19 and an annular projection 20 the latter being disposed centrally of the yoke member. The upper portion of the yoke is provided with an opening 20$^a$ for receiving a nut 21 that interacts with the screw thread portion 22 of a valve stem 23.

The valve stem 23 is provided with an enlarged end 24 adapted to engage a boss 25 on the valve 8. The projection 20 is packed with a suitable packing 26 forming a stuffing box to seal the cylinder chamber against leakage through the cover. The valve stem 23 is provided at its upper end with a hand wheel 27 for manually closing the valve 8.

The valve casing is provided with a by-pass 28 connected to the cover member 16 and at its other end to the outlet side of the valve as shown. The by-pass may be closed by the valve 29, permanently closing the main passage valve, or it may be controlled by the valve 32 which is the pilot valve for controlling the opening and closing operations of the main valve 8. The pilot valve mechanism comprises a fixed diaphragm 31 and a sleeve valve 32 which is adapted to control an opening 33 provided in the diaphragm. A sleeve portion 34 of the valve 32 is loosely fitted in the valve casing 30 to permit leakage of water to the back of the valve which permits the latter to seat by gravity when pressure is balanced above and below it.

A valve cover 35 is secured to the casing 30 by having screw thread engagement therewith and is provided with offset portions 36 and 37 having openings 38 and 39, respectively, the latter connecting with a waste pipe 39$^a$. The cover member 35 is provided with a valve seat 40 and a valve 41 having a long stem 42 that projects through the opening 38 of the cover, is disposed therein and adapted to close against the seat 40. The valve 41 is biased by a spring 43 which is retained in a casing 44 provided with perforations 45, the casing 44 being screwed into the cover as shown.

The valve 41 is operated by a solenoid actuated lever 46 that fulcrums at 47 on a bracket 48. The bracket is mounted on a plate 49 that is fastened on an upright or standard 50 which is secured to the valve casing. One side of the lever 46 is pivotally connected at 51 to a plunger 52 that constitutes the movable armature of a solenoid 53. The solenoid is secured by a bracket 54 and an extension bolt 55 to the plate 49. Movement of the plunger 52 is limited by a stop 56 that is secured in the mounting plate 49.

The solenoid 53 is provided with suitable terminal leads 57 and 58 whereby it is connected in an electrical circuit. The circuit is controlled by a switch, not shown, which may be remote from the valve mechanism and manipulated by the operator to open or close the main valve.

The operation of the valve mechanism hereinabove set forth is briefly as follows:

With the solenoid deenergized and the valve stem 42 of the pilot valve free to move upwardly against the lever 46, the valve 41 will close on its seat 40 against which it is normally biased by its spring 43. Water will then leak around the sleeve portion 34 and fill the chamber D behind it. The pressure on valve 32 being balanced, it will seat by gravity, and remain seated until the solenoid is operated.

When the pilot valve 32 is closed, the pressure in the cylinder chamber will build up by leakage through port 8$^a$ until it is equal to the pressure on the inlet side of the valve. And since the piston area of the upper portion of the main valve 8 is greater than that closing the port 3, the valve 8 will be forced to its seat, which is its normal position.

The valve is raised from its seat in the following manner:

The solenoid 53 is energized which establishes a magnetic field that acts on the movable armature 52 pulling it upward. Movement of the armature 52 actuates the lever 46 causing it to engage the valve stem 42 to press the latter downward to unseat the valve 41. As the valve 41 is opened water will flow through the waste pipe 39$^a$, thereby relieving pressure above the valve 32, permitting it to be forced up by pressure below it. When the passage 33 is open, pressure in chamber C above the main cylinder is relieved through the by-pass 28.

As pressure in the chamber C behind the main valve is relieved, pressure from the intake side below the main valve raises the valve 8 from its seat, thereby opening the passage 3 and permitting the flow of water from the inlet A to the delivery side B of the main valve.

When the valve is in its open position and it is desired to close the same, the solenoid 53 is deenergized and its plunger 52 will drop to the position shown in the drawing, thereby releasing the valve stem 42 and permitting the valve 41 to seat. Since there is a constant leakage through the port 8$^a$ of the main valve, pressure will again build up in the cylinder chamber and water passing through the by-pass 28 will leak past the sleeve valve 32, filling the valve chamber which permits the valve 32 to seat by gravity.

If it is desired to positively close the valve for repairs or other purposes the valve stem 23 is screwed down until it forces the valve 8 firmly to its seat.

The structure shown in Fig. 2 functions similarly to that described above and differs in construction, only, in the shape of the passage-controlling valve.

In the casing shown in Fig. 2, flanges 60 and 61 are provided at right angles instead of in straight alignment as shown in Fig. 1. The flange 60 constitutes the valve inlet connetion and 61 the outlet or delivery side of the valve. The upper portion of the valve casing is of cylindrical shape as in the former case and is provided with a liner or sleeve 62. An annular valve seat 63 is secured in the valve casing as shown and is provided with radial arms 64 that terminate into a hub portion 65 which constitutes a guide for a valve stem 66. Secured to the valve stem are a valve 67 and a piston member 68, the valve 67 being provided with liners 69 which engage the seat 63 of the valve. And the piston 68 is disposed in the cylinder 62. The valve stem 66 is provided with a passage 70 which extends the full length of the stem and communicates with the ports 71.

The operation of the valve shown in Fig. 2 is briefly as follows:

The passage 70 of the valve stem 66 is unobstructed to the flow of water from the inlet side of the valve for the purpose of filling the cylinder chamber behind the piston 68. Since the area of the piston 68 is greater than the area of the valve 67 the valve will be normally seated. The solenoid-controlled pilot valve and by-pass mechanism function in the identical manner as hereinbefore described to open the passage-closing valve 67 by relieving the pressure in the cylinder chamber. Pressure on the inlet side of the valve against the valve 67 will then raise the valve from its seat and establish a flow from A, the inlet side of the valve through the port to the outlet side B. To close the main valve the solenoid is released to permit the pilot valve to become seated and pressure will again build up in the cylinder chamber behind the piston 68 forcing it downward and bringing the valve 67 on its seat 63.

During the opening of the valve shown in Fig. 2 the water in the cylinder chamber acts as a cushion to prevent impact. Similarly for the closing of the valve the water flowing through the valve passage will cushion the valve in its downward movement on its seat.

It will be noted that although two very dissimilar types of valves have been illustrated in Figs. 1 and 2 they are both designed to be automatically cushioned in their opening and closing operations.

It is evident from the foregoing description of this invention that valves made in accordance therewith are positive in their operation of remaining closed by the pressure inherent on the inlet side of the valve mechanism, and the means provided for opening the valve is likewise positive in its function. A feature of the invention is the remote control mechanism making it possible for a single operator to manipulate or control a number of such valves from a central point.

The valves disclosed herein are particularly applicable for use in coke quenching systems, although they may be utilized for other purposes.

Although several embodiments of the invention have been herein set forth and described it will be obvious to those skilled in the art that various modifications may be made in the details of construction and in the arrangement and design of the several cooperating parts without departing from the principles herein set forth.

I claim:

1. A valve mechanism comprising a main casing having an inlet and an outlet chamber, a diaphragm between the chambers with a port therein, a main valve controlling the port, said valve comprising a rear piston of larger area than said port, a cylinder enclosing said piston, the main valve having a leakage port leading from the side exposed to water pressure in the casing to said cylinder whereby pressure behind the piston closes the valve, a by-pass from the cylinder to the outlet side of the casing, a valve mechanism controlling said by-pass and comprising a pilot valve adapted to seat by gravity to close the by-pass, the pilot valve being slidably mounted in a cylindrical casing so as to permit leakage to the rear of the valve, a third valve, a spring normally closing the third valve, said third valve controlling an escape port from the cylinder at the rear of the pilot valve, and a solenoid adapted to open the third valve against spring pressure, whereby to permit the main valve to be unseated by normal water pressure beneath it while the solenoid is operating.

2. The combination of claim 1, and manually operable means to lock the main valve in closed position regardless of actuation of the solenoid.

3. The combination with a slidably mounted main valve normally held in closed position by water pressure on its rear side applied from the inlet side through a port extending from the exposed side of the valve to an enlarged rear surface enclosed in a cylinder, of a conduit leading from the cylinder to the outlet side of the main valve, and a pilot valve mechanism controlling the passage through said conduit, said mechanism comprising a vertically recoprical valve adapted to seat by gravity to close said passage and mounted to permit leakage to its rear side, an area of the reciprocal valve larger than that of the passage controlled by it being freely exposed to fluid pressure from the said cylinder, a third valve controlling and normally closing an escape port behind the reciprocal valve, and a solenoid adapted to force said third valve open and hold it open while the solenoid is energized whereby to open the main valve during energizing of the solenoid.

In testimony whereof I sign my name.

EDWARD V. ANDERSON.